United States Patent [19]

Beauch

[11] Patent Number: 4,892,330
[45] Date of Patent: Jan. 9, 1990

[54] ADJUSTABLE STEERING COLUMN

[75] Inventor: Howard D. Beauch, Frankenmuth, Mich.

[73] Assignee: General Motors Corporation, Detroit, Mich.

[21] Appl. No.: 285,693

[22] Filed: Dec. 16, 1988

[51] Int. Cl.[4] .............................................. B62D 1/18
[52] U.S. Cl. ........................................ 280/775; 74/493
[58] Field of Search ............................ 280/775; 74/493

[56] References Cited

U.S. PATENT DOCUMENTS

| | | | |
|---|---|---|---|
| 3,392,599 | 7/1968 | White | 74/492 |
| 4,363,499 | 12/1982 | Watanabe et al. | 280/775 |
| 4,463,626 | 8/1984 | Kazaoka et al. | 280/775 |
| 4,470,322 | 9/1984 | Beauch | 74/493 |
| 4,472,982 | 9/1984 | Nishikawa | 74/493 |
| 4,538,478 | 9/1985 | Sato et al. | 280/775 |
| 4,594,909 | 6/1986 | Yamaguchi | 280/775 |
| 4,691,587 | 9/1987 | Farrand et al. | 280/775 |

Primary Examiner—Kenneth R. Rice
Attorney, Agent, or Firm—Saul Schwartz

[57] ABSTRACT

An adjustable steering column including a tubular mast jacket assembly adapted for stationary mounting on a vehicle body, a steering shaft in the mast jacket, a lower mount supporting the steering shaft on the mast jacket near the lower end of the latter for rotation and for up and down tilting between upper and lower limit positions in the vertical center plane of the mast jacket, an upper mount supporting the steering shaft on the mast jacket near the upper end of the latter for rotation and for the up and down tilting movement, and a tilt lock for maintaining the steering shaft in any of a plurality of adjusted positions between the upper and lower limit positions through simple grasp and release of a manual release lever.

5 Claims, 2 Drawing Sheets

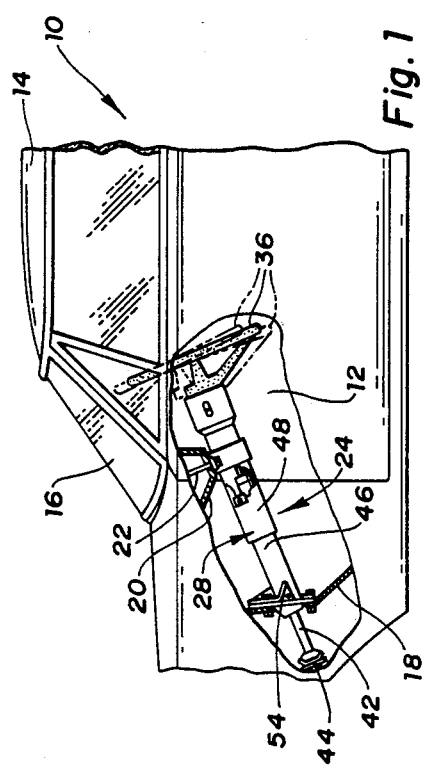
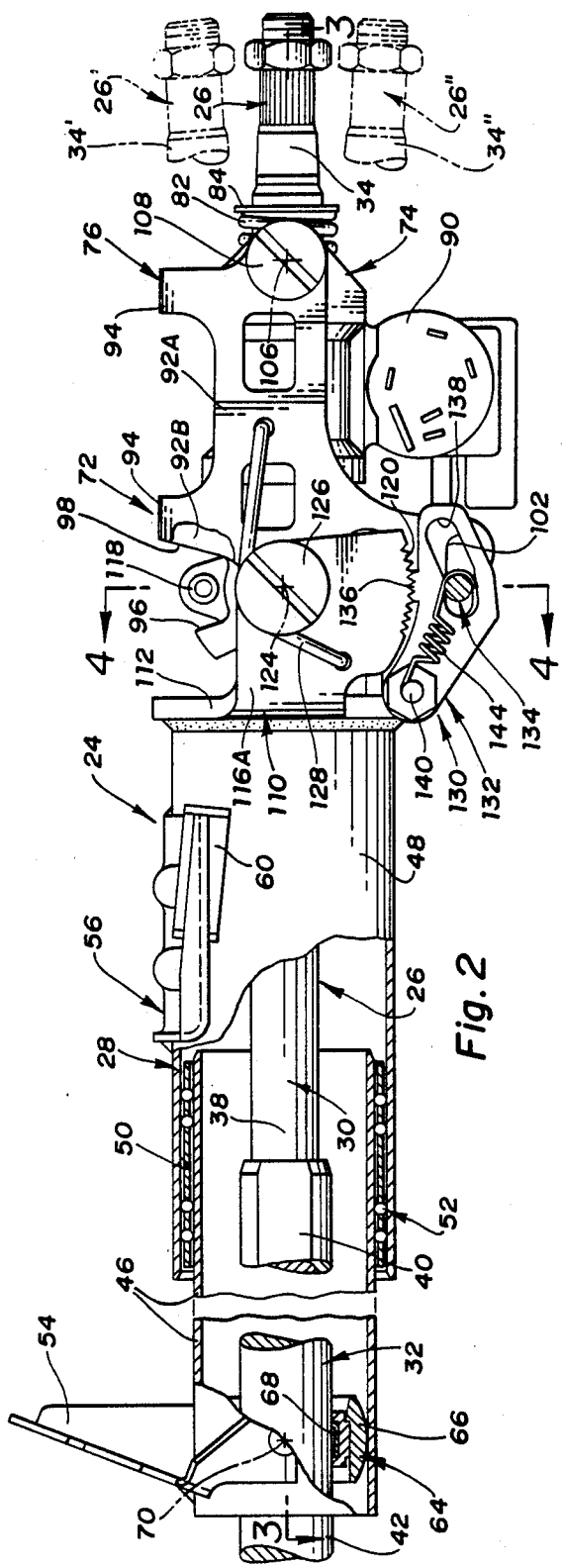

ADJUSTABLE STEERING COLUMN

FIELD OF THE INVENTION

This invention relates to adjustable steering columns for automotive vehicles.

BACKGROUND OF THE INVENTION

In "raked" type adjustable steering columns, the entire column tilts up and down about a center near the bottom of the column and is held stationary by a relatively simple clamp which the driver manually opens and closes as desired. In "tilt-wheel" type adjustable steering columns, the steering column is stationary and only a top portion of the column to which the steering wheel is attached tilts up and down. The top portion is locked by a toothed lever on a stationary part of the column engaging a toothed rack on the tilting part, the toothed lever being actuated by a release lever which the driver pulls when adjustment is desired. Positive features of raked columns include the absence of an expensive universal joint in the steering shaft and a relatively flat steering wheel tilt arc. Positive features of tilt-wheel columns include the stationary mounting of the column and the simple adjustment. An adjustable steering column according to this invention is a hybrid column combining positive features of raked columns and tilt-wheel columns.

SUMMARY OF THE INVENTION

This invention is a new and improved adjustable steering column for automotive vehicles. The steering column according to this invention includes a stationary tubular mast jacket assembly, a steering shaft in the mast jacket assembly, a lower mount between the steering shaft and the mast jacket assembly which supports the steering shaft for rotation and for up and down tilting about a point near the bottom of the mast jacket assembly, and an upper mount which supports the top of the steering shaft on the mast jacket assembly for rotation and for up and down movement and which incorporates a release lever type tilt lock. The upper mount includes a bearing housing journaled on the steering shaft by a pair of bearings so that the shaft is rotatable relative to the bearing housing and an inverted U-shaped tilt housing in which the bearing housing is nested. The bearing housing is pivotally attached to the tilt housing and the tilt housing is pivotally attached to the mast jacket so that up and down movement of the steering shaft is accompanied by scissors-like flexure of the bearing and tilt housings between the steering shaft and the mast jacket assembly. The tilt lock includes a toothed rack on the mast jacket assembly, a toothed locking lever on the tilt housing pivotable between a locking position engaging the rack and locking the tilt housing relative to the mast jacket assembly and an unlocking position remote from the toothed rack, and a release lever pivotally supported on the tilt housing and operative when pulled by the driver to move the locking lever to the unlocking position.

DESCRIPTION OF THE DRAWINGS

FIG. 1 is a broken away side view of an automobile having an adjustable steering column according to this invention;

FIG. 2 is an enlarged partially broken away side view of an adjustable steering column according to this invention;

DESCRIPTION OF THE PREFERRED EMBODIMENT

Figure 3:
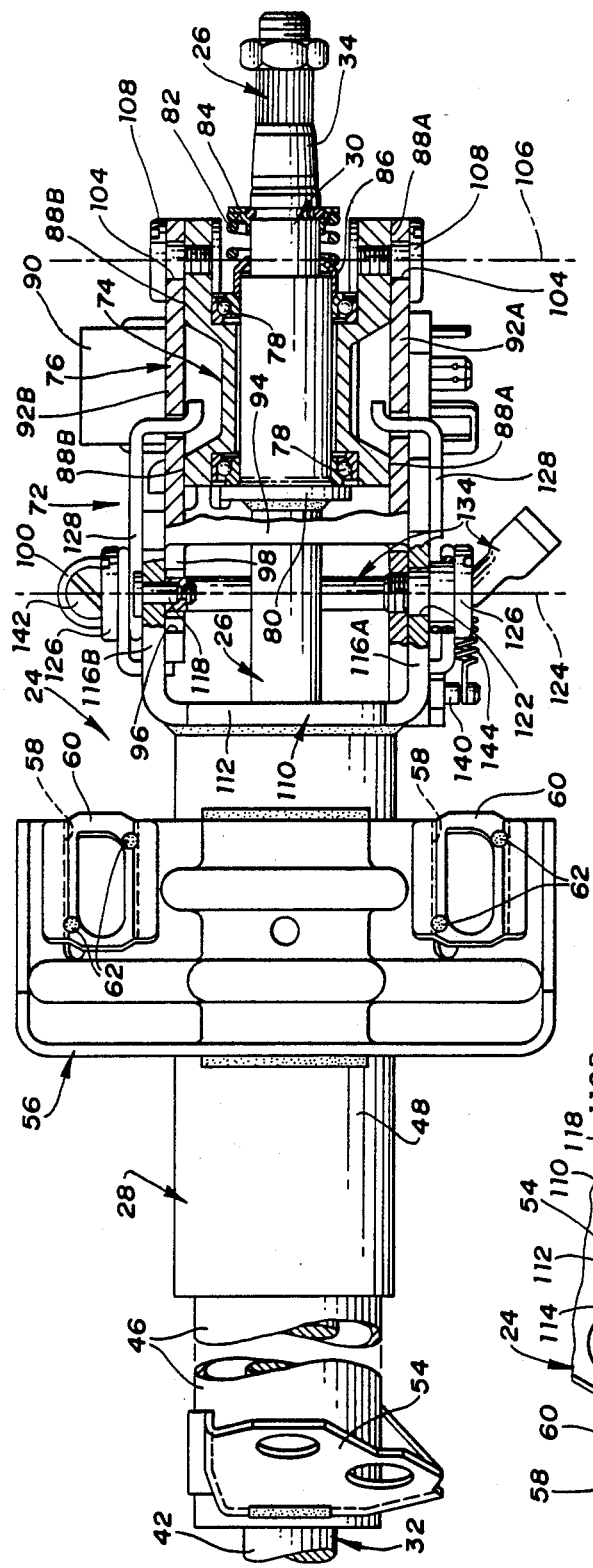
FIG. 3 is a partially broken away view taken generally along the plane indicated by lines 3—3 in FIG. 2.

Referring to FIG. 1 of the drawings, an automobile vehicle body 10 has a passenger compartment 12 bounded by a roof 14, a front windshield 16, and a lower panel structure 18 below the windshield. A structurally rigid instrument panel support 20 of the vehicle body is disposed at the front of the passenger compartment and includes a pair of hanger bolts projecting generally vertically down, only one hanger bolt 22 being shown in FIG. 1. The hanger bolts are threaded at their distal ends and, as described below, releasably attach the upper end of a collapsible and adjustable steering column 24 according to this invention to the instrument panel support.

As seen best in FIGS. 1-3, the steering column 24 has a collapsible steering shaft assembly 86 in a collapsible mast jacket assembly 28. The steering shaft assembly 26 includes an upper shaft 30 and a lower shaft 32. The upper shaft 30 has a serrated and threaded upper end 34 for reception of a steering wheel 36, FIG. 1, and a non-circular lower end 38. The lower shaft 32 has a sleeve-like non-circular upper end 40 in which the lower end 38 of the upper shaft is slidably received and a lower end 42 connected to a steering gear 44 of the vehicle through a conventional coupling. The upper and lower shafts transfer steering inputs at the steering wheel 36 to the steering gear in conventional fashion. A plurality of plastic shear pins, not shown, between the upper and lower shafts 30,32 maintain the relative axial positions between the shafts until a forward impact on the steering wheel shears the pins and the shafts collapse telescopically.

The mast jacket assembly 28 includes a tubular lower mast jacket 46 and a tubular upper mast jacket 48. An annulus 50, FIG. 2, is defined where the upper mast jacket overlaps the lower mast jacket. A roll deformer energy absorber 52 is disposed in the annulus 50 and rigidly connects the upper mast jacket to the lower mast jacket. A bracket 54 on the lower mast jacket 46 connects the lower mast jacket to the panel structure 18 of the vehicle body such that the lower mast jacket is stationary in its longitudinal direction. A forward impact on the steering wheel 36, transferred to the upper mast jacket as described below, initiates telescopic collapse of the upper mast jacket relative to the lower mast jacket and energy absorption as the roll deformers in the energy absorber 52 roll tracks in the mast jackets. A typical roll deformer energy absorber is described in U.S. Pat. No. 3,392,599, issued July 16, 1968 to R. L. White and assigned to the assignee of this invention.

A wing-like bracket 56 is rigidly attached to the upper mast jacket 48. The bracket 56 has a pair of slots 58 opening toward the steering wheel 36. A capsule 60 is disposed in each slot 58 and retained therein by a plurality of plastic shear pins 62, FIG. 3. The hanger bolts of the instrument panel support project through slots in the respective capsules and the nuts on the hanger bolts clamp the capsules against rigid stops. The brackets 54 and 56 cooperate to normally rigidly attach the mast jacket assembly 28 to the vehicle body. At a forward impact on the steering wheel, the plastic pins 62 shear and release the bracket 56 from the capsules to permit the aforesaid collapse of the upper mast jacket relative to the lower mast jacket.

As seen best in FIG. 2, a lower mount 64 is disposed between the lower shaft 42 and the lower mast jacket 46. The mount 64 has a partly spherical outer member 66 which engages the lower mast jacket and an cylindrical inner member 68 attached to the lower shaft 42. The inner member is rotatable relative to the outer member and the outer member is tiltable relative to the lower mast jacket. Accordingly, the steering shaft assembly 26 is supported by the lower mount 64 on the mast jacket assembly 28 for rotation and for up and down tilting in the vertical center plane of the mast jacket assembly about a point 70, FIG. 2, near the lower end of the lower mast jacket. The steering shaft assembly 26 has a center position, FIG. 2, aligned on the longitudinal centerline of the mast jacket assembly 28, an upper limit position 26' above the center position, and a lower limit position 26" below the center position.

Figure 4:
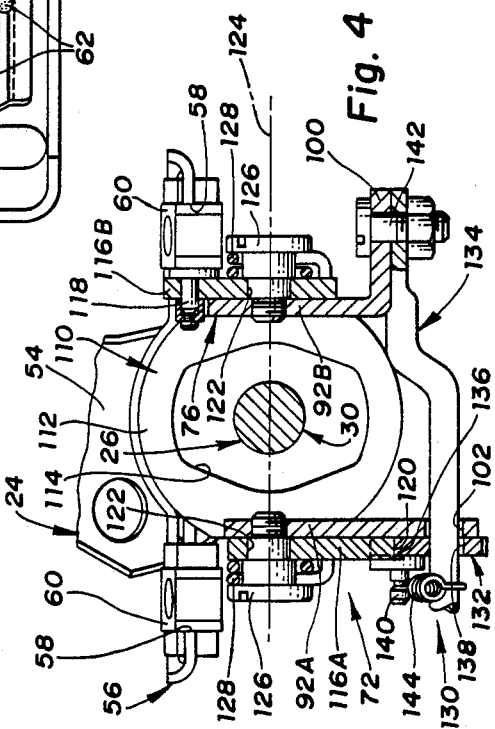
FIG. 4 is a sectional view taken generally along the plane indicated by lines 4—4 in FIG. 2.

The upper end of the steering shaft assembly 26 is supported on the mast jacket assembly 28 for rotation and for up and down movement between the upper and lower limit positions by an upper mount 72, FIGS. 2-4. The upper mount includes a bearing housing 74 and an inverted U-shaped tilt housing 76 in which the bearing housing is nested. The bearing housing 74 is generally tubular and is loosely received over the upper shaft 30 near the upper end 34 thereof. The upper shaft is rotatably journaled on the bearing housing 74 by a pair of ball bearings 78. The inner bearing housing 74 is captured against an annular shoulder 80 on the upper shaft 30 by a spring 82 seated between an outside retainer 84 on the upper shaft and an inside retainer 86 seated against the outboard one of the bearings 78. The enlarged ends of the bearing housing 74 are flattened on opposite vertical sides to provide coplanar pairs of lateral bearing surfaces 88A-B, FIG. 3. A lock cylinder/ignition switch portion 90 of the bearing housing 74 carries a conventional key operated automotive ignition switch, not shown.

The inverted U-shaped tilt housing 76 has a pair of laterally spaced vertical sides 92A-B which slidingly bear against the bearing surfaces 88A-B, respectively, on the bearing housing 74. The vertical sides are rigidly interconnected by a pair of integral cross members 94 of the tilt housing. The vertical side 92B has a down-stop edge 96 and an up-stop edge 98 near its top and a laterally outward bent tab 100 at its bottom, FIG. 4. The opposite vertical side 92A has an extended lower part in which is located a slot 102, FIGS. 2 and 4. A pair of circular holes 104 in the vertical sides 92A-B are aligned on a lateral axis 106, FIG. 3, and rotatably receive respective ones of a pair of pivot pins 108. The pins 108 have threaded ends received in appropriate tapped holes in the bearing housing 74 whereby the inner and outer housings are relatively pivotable about the axis 106.

A U-shaped bracket 110 is welded to the upper end of upper mast jacket 48. A web part 112 of the bracket 110 has an opening 114, FIG. 4, for passage of the upper shaft 30. The bracket 110 further includes a pair of parallel sides 116A-B which closely receive therebetween the vertical sides 92A-B of the tilt housing 76. The side 116B of the bracket 110 has a pin 118 thereon which projects between the up-stop and down-stop edges 96 and 98 of the tilt housing. The side 116A of the bracket 110 has a lower edge on which a toothed rack 120 is formed. A pair of circular holes 122 in the vertical sides 116A-B of the bracket 110 are aligned on a lateral axis 124, FIG. 4, and rotatably receive respective ones of a second pair of pivot pins 126. The pins 126 have threaded ends received in appropriate tapped holes in the vertical sides 92A-B of the tilt housing 76 whereby the tilt housing is pivotable relative to the upper mast jacket 48 about the axis 124. A pair of coil torsion springs 128 are mounted on the pins 126 with ends in sockets in the bracket 110 and the tilt housing 76 and bias the tilt housing up or counter-clockwise, FIG. 2, about the axis 124.

As seen best in FIGS. 2 and 3, the upper mount 72 incorporates a tilt lock 130. The tilt lock includes, in addition to the rack 120, a lock lever 132 and a release lever 134. The lock lever 132 has a toothed abutment 136 on an upper edge thereof and a cam slot 138 therein. The lock lever is supported on a pin 140 on the tilt housing for pivotal movement relative thereto between a locking position, FIG. 2, wherein the toothed abutment engages the toothed rack 120 and an unlocking position, not show, wherein the toothed abutment is disengaged from the toothed rack. When the locking lever is in the locking position, the tilt housing 76 is locked or immobilized relative to the upper mast jacket 48. When the locking lever is in the unlocking position, the tilt housing is freely pivotably relative to the upper mast jacket between extreme positions defined by engagement of the pin 118 on the the up-stop and down-stop edges 98 and 96 of the tilt housing.

As seen best in FIG. 4, the release lever 134 is supported on the tilt housing 76 for pivotal movement is a generally horizontal plane by a pin 142 on the lateral tab 100. The release lever projects through the slot 102 in the side 116A of the tilt housing and through the cam slot 138 in the lock lever 132. A spring 144 has one end hooked over the release lever and the other end hooked over the pin 140 on which the lock lever 132 is pivotally supported. The spring 144 biases the release lever toward the left end, FIG. 2, of the slot 102 in the tilt housing 76. The cam slot 138 is oriented on the lock lever 132 such that when the release lever is in a retracted position thereof at the left end of the slot 102 the lock lever is in the locking position and when the release lever is in an extended position thereof at the right end of the slot 102 the lock lever is in the unlocking position.

The steering column 24 adjusts as follows. The driver of the vehicle manually grasps the release lever 134 and pulls the same toward the steering wheel 36 to its extended position. The release lever 134 cams the locking lever 132 to the unlocking position. If the steering wheel is not otherwise restrained, the springs 128 pivot the tilt housing 76 to its upper most position defined by engagement of the up-stop edge 98 against the pin 118. Concurrently, the bearing housing pivots in scissors-like fashion relative to the tilt housing about axis 106. When the tilt housing 76 is in its uppermost position, the steering shaft assembly 26 is in its upper limit position 26, providing most clearance under the steering wheel 36 for convenient entry or exit of a driver from the passenger compartment. When the driver releases the release lever, the spring 144 pulls the release lever back to its retracted position camming the lock lever back to the locking position. To adjust the steering wheel to any desired height between the upper and lower limit positions 26',26" of the steering shaft assembly, the driver simply releases the release lever at the desired position of the steering wheel whereupon the lock lever returns to the locking position capturing the adjusted position.

The embodiments of the invention in which an exclusive property or privilege is claimed are defined as follows:

1. An adjustable steering column comprising:
   a tubular mast jacket having a lower end and an upper end each adapted for attachment to a vehicle body,
   a steering shaft disposed in said mast jacket with an upper end projecting beyond said mast jacket upper end,
   a lower mount supporting said steering shaft on said mast jacket near said lower end thereof for rotation and for tilting in a vertical center plane of said mast jacket about a point near said lower end thereof between an upper limit position and a lower limit position,
   an upper mount supporting said steering shaft on said mast jacket near said upper end thereof for rotation and for said tilting movement in the vertical center plane of said mast jacket, and
   a tilt lock between said upper mount and said mast jacket operative to releasably lock said steering shaft in a plurality of positions between said upper limit position and said lower limit position.

2. The steering column recited in claim 1 wherein said lower mount includes
   an annular outer member having a spherical outside surface engaging an inside surface of said mast jacket, and
   an annular inner member attached to said steering shaft and mounted on said outer member for rotation relative thereto.

3. The steering column recited in claim 2 wherein said upper mount includes
   a bearing housing disposed over said upper end of said steering shaft projecting beyond said upper end of said mast jacket,
   bearing means between said bearing housing and said steering shaft upper end rotatably journaling said steering shaft on said bearing housing,
   an inverted U-shaped tilt housing having a pair of sides straddling said bearing housing,
   means connecting said bearing housing to said pair of sides of said tilt housing for pivotal movement about a first lateral axis perpendicular to the vertical center plane of said mast jacket, and
   means connecting said pair of sides of said tilt housing to said mast jacket near said upper end thereof for pivotal movement about a second lateral axis perpendicular to the vertical center plane of said mast jacket and spaced apart from said first lateral axis.

4. The steering column recited in claim 3 wherein said tilt lock includes
   means defining a toothed rack on said mast jacket near said upper end thereof,
   a locking lever having a toothed abutment thereon,
   means mounting said locking lever on one of said pair of sides of said tilt housing for pivotal movement between a locking position wherein said toothed abutment engages said toothed rack and prevents pivotal movement of said tilt housing about said second lateral axis and an unlocking position wherein said toothed abutment is remote from said toothed rack and said tilt housing is freely pivotable about said second transverse axis,
   a release lever pivotally supported on the other of said pair of sides of said tilt housing for manual actuation from a retracted position to an extended position, and
   means connecting said release lever to said locking lever such that said locking lever is in said locking position when said release lever is in said retracted position and said locking lever is in said unlocking position when said release lever is in said extended position.

5. The steering column recited in claim 4 and further including
   a first spring between said tilt housing and said release lever biasing said release lever to said retracted position, and
   a second spring biasing said tilt housing to a position relative to said mast jacket upper end corresponding to said upper limit position of said steering shaft.

* * * * *